United States Patent [19]

Hofmann et al.

[11] Patent Number: 4,676,489

[45] Date of Patent: Jun. 30, 1987

[54] TWO CHAMBER ENGINE MOUNT WITH HYDRAULIC DAMPING

[75] Inventors: Manfred Hofmann, Hünfelden; Hans Müller, Höhr-Grenzhausen, both of Fed. Rep. of Germany

[73] Assignee: Metzeler Kautschuk GmbH, Munich, Fed. Rep. of Germany

[21] Appl. No.: 695,447

[22] Filed: Jan. 28, 1985

[30] Foreign Application Priority Data

Jan. 26, 1984 [DE] Fed. Rep. of Germany ....... 3402715

[51] Int. Cl.⁴ .............................................. F16F 5/00
[52] U.S. Cl. ................................. 267/140.1; 267/122
[58] Field of Search .......................... 188/320; 248/562; 267/8 R, 63 R, 121, 122, 140.1

[56] References Cited

U.S. PATENT DOCUMENTS 4,262,886  4/1981  Le Salver et al. ................... 267/8 R
4,483,521 11/1984  Kakimoto ........................... 267/8 R
4,588,173  5/1986  Gold et al. ........................ 267/8 R X

FOREIGN PATENT DOCUMENTS 0098331  1/1984  European Pat. Off. ......... 267/140.1
2041485  9/1980  United Kingdom ................ 267/121

Primary Examiner—Duane A. Reger
Attorney, Agent, or Firm—Herbert L. Lerner; Laurence A. Greenberg

[57] ABSTRACT

1A two chamber engine mount with hydraulic damping includes a housing having rubber-elastic walls, an intermediate plate disposed in the housing between the walls dividing the housing into fluid-filled chambers, the intermediate plate having a substantially spiral-shaped canal formed therein interconnecting the chambers, the canal having a length being a multiple of the diameter thereof, and the intermediate plate having at least one orifice vertically formed therethrough being hydraulically parallel with the canal.

5 Claims, 4 Drawing Figures

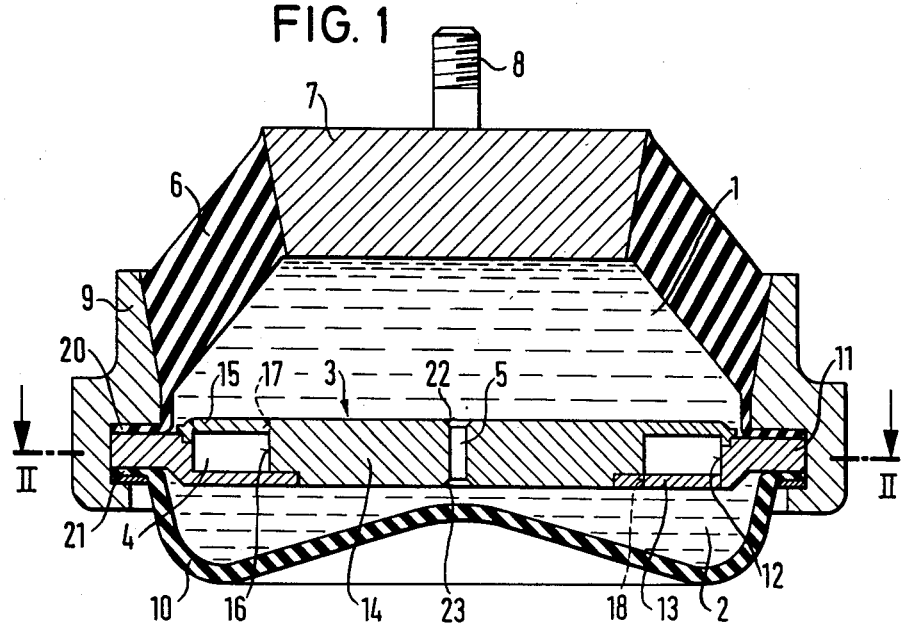
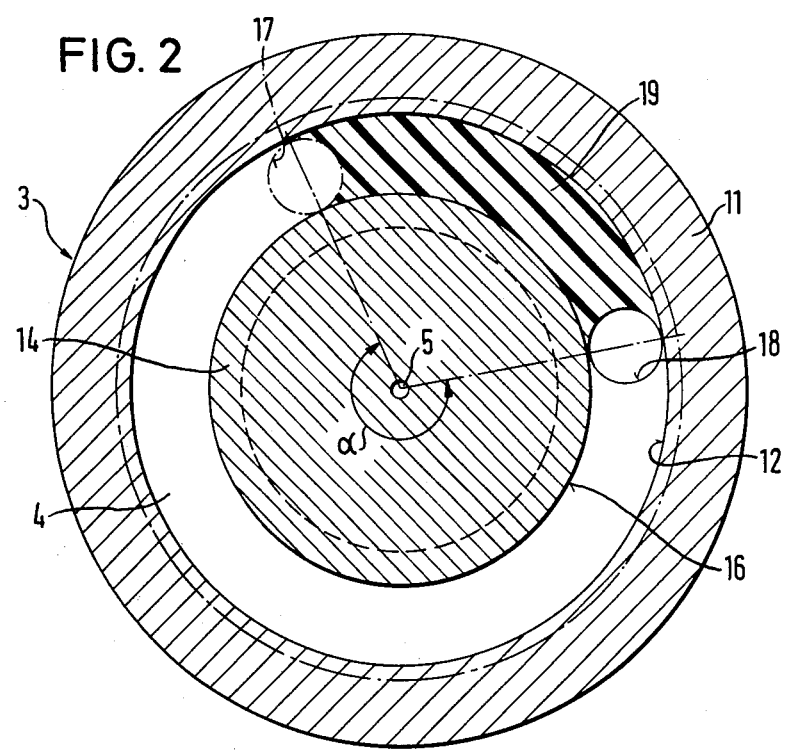

TWO CHAMBER ENGINE MOUNT WITH HYDRAULIC DAMPING

The invention relates to a two chamber engine or motor mount with hydraulic damping, having fluid-filled chambers with rubber-elastic peripheral walls which are interconnected by an approximately spiral-shaped canal formed in an intermediate plate, the length of the canal being a multiple of the diameter thereof.

An engine mount of this type is disclosed, for instance, in German Published, Non-Prosecuted Application DE-OS No. 30 19 337. In that disclosure, a spiral-shaped canal is provided in the intermediate plate, having a nominal length to diameter ratio greater than 4. This was done because with ratios greater than that, a laminar flow occurs in a canal with a circular cross section. The advantage of such a long canal lies in the fact that the column of fluid enclosed by the canal actually acts as a damping mass, and has an excellent damping effect for vibrations with a great amplitude and a low frequency. The greatest damping effect takes place when the fluid column trapped in the canal vibrates in resonance with the exciter frequency. When very large openings of the canal are provided, ratios which are smaller may also be possible. When dealing with such hydraulically damped mounts, the tendency is to make these canals longer and longer, in order to increase the absolute damping values. Since the thermal inertia and therefore the vibrating fluid masses are predominant in very long canals, this results in the maximum damping values being to a great extent independent of the frequency even at different amplitudes. For certain applications, this is a disadvantage because if the maximum damping is adjusted to the vertical self resonance of the motor in the range of about 8 to 12 Hz, very little damping is provided at higher frequencies in the range of about 15 to 30 Hz.

It is accordingly an object of the invention to provide a two chamber engine mount with hydraulic damping which overcomes the hereinafore-mentioned disadvantages of the heretofore-known devices of this general type, and to create an engine mount which is capable of providing broad-band damping of all amplitudes.

With the foregoing and other objects in view there is provided, in accordance with the invention, a two chamber engine mount with hydraulic damping, comprising a housing having surrounding or peripheral rubber-elastic walls, an intermediate plate disposed in the housing between the walls dividing the housing into fluid-filled chambers, the intermediate plate having a substantially spiral-shaped canal formed therein interconnecting the chambers, the canal having a length being a multiple of the diameter thereof, and the intermediate plate having at least one orifice vertically formed therethrough being hydraulically parallel with the canal.

This parallel construction of a short-path orifice provides a non-linear frequency dependency, so that the respective damping maximum is shifted to a higher frequency with decreasing amplitude. Since the amplitudes decrease with increasing frequency in motor vehicles, such a construction results in the engine mount in the vehicle damping a wide band of all amplitudes.

In accordance with another feature of the invention, the orifice is a circular canal and the intermediate plate has a conically-expanded inlet and a conically-expanded outlet formed therein in communication with the circular canal.

In accordance with a further feature of the invention, the ratio of the length of the spiral-shaped canal to the length of the orifice is 1–20 and the ratio of the volumes enclosed by the spiral-shaped canal and the orifice is 10–500.

In accordance with an added feature of the invention, the intermediate plate is formed of first and second parts, the first part being an outer plate-shaped holding ring having an upper surface, the holding ring having a central cylindrical recess formed therein defining an inner periphery of the holding ring determining the diameter of the recess and a bottom plate determining the lower boundary of the recess, the second part being a substantially T-shaped orifice disc having an outer rim defining a larger outer periphery and an inner core defining a smaller outer periphery, the orifice disc being disposed in the recess with the outer rim of the orifice disc disposed on the upper surface of the holding ring, the inner periphery of the holding ring being spaced from the smaller outer periphery of the orifice disc defining the spiral-shaped canal therebetween, the outer rim of the orifice disc having an inlet opening of the spiral-shaped canal formed therein, and the bottom plate of the holding ring having an outlet opening of the spiral-shaped canal formed therein.

In accordance with an additional feature of the invention, the orifice is formed in the orifice disc.

In accordance with a concomitant feature of the invention, the spiral-shaped canal is a continuous, circular or surrounding annular space, and including rigid material filling a section of the annular space between the inlet and outlet openings.

Other features which are considered as characteristic for the invention are set forth in the appended claims.

Although the invention is illustrated and described herein as embodied in a two chamber engine mount with hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying dawings, in which:

FIG. 1 is a diagrammatic longitudinal-sectional view of an engine mount according to the invention;

FIG. 2 is a cross-sectional view taken through the intermediate plate of the engine mount, taken along the line II—II in FIG. 1, in the direction of the arrows;

Figure 3:
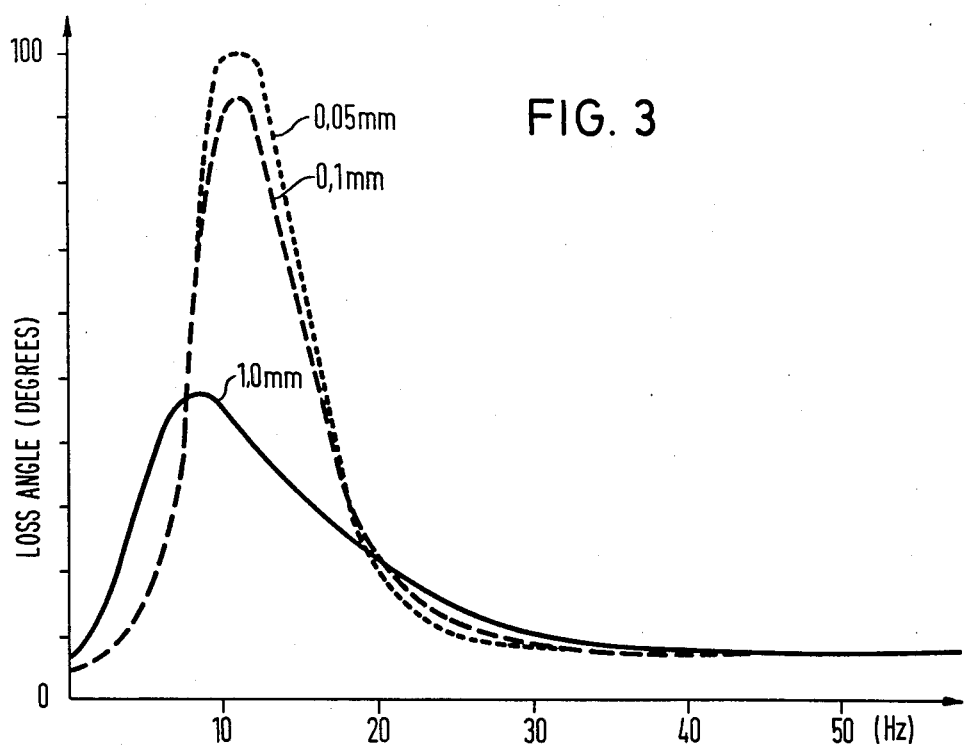
FIG. 3 is a graph of the damping curve of an engine mount which only has a spirally-shaped canal.

Referring now to the figures of the drawings in detail and first particularly to FIG. 1 thereof, there is seen an engine mount formed essentially of an upper chamber 1 at the motor side of the mount and a lower chamber 2. The chambers are hydraulically interconnected by an approximately spiral or helical-shaped canal 4 and an orifice 5, both of which are disposed in an intermediate plate 3 that will be described in greater detail below. The orifice has a conically-expanded inlet 22 and outlet 23. The upper chamber 1 is formed by a strong, solid or thick-walled hollow, conical chamber wall 6 made of a rubber-elastic material. The upper end of the chamber wall 6 is permanently connected to a support plate 7, which is furnished with a bolt 8 for connection to the motor or engine. The lower region of the chamber wall 6 is permanently connected with a holding flange 9 for connection to a non-illustrated countersupport and a frame of the vehicle. The lower chamber 2 is also made of a rubber-elastic, but softer material, cup-shaped chamber wall 10 which is permanently connected to the flange 9.

Both chambers 1 and 2 are filled with a hydraulic fluid, generally a mixture of glycol and water.

According to the invention as seen in FIGS. 1 and 2, the intermediate plate 3 is constructed in two parts. One part is an outer plate-shaped holding ring 11 with a central cylindrical recess 12. The recess 12 is formed in such a way that an annular bottom plate 13 is provided. The other part is an approximately T-shaped orifice disc or plate 14 with an outer rim 15 and an inner core which is fitted into the recess 12. The positioning of the rim 15 at the top of the disc 14 gives it a T-shape. The outer rim 15 of the orifice plate sits on the upper surface of the holding ring 11. The canal 4 is formed between the outer periphery 16 of the inner core of the orifice plate 14 and the inner periphery of the holding ring 11 defining the diameter of the recess 12. As especially shown in FIG. 2, the canal 4 has an inlet opening 17 at the upper rim 15 of the orifice plate, and an outlet opening 18 leading into the lower chamber 2 which is formed in the bottom plate 13 that forms the boundary of the recess 12.

The orifice 5 is a vertical, central through hole formed in the orifice plate 14.

As shown especially clearly in FIG. 2, depending on the required damping, the canal 4 only extends around the circumferential angle $\alpha$ of the engine mount. It is accordingly possible to machine only this circumferential region $\alpha$ for the canal 4 in the holding ring 11 and/or in the orifice plate 14, or to form an annular space all around which is only filled in and closed in the unused annular region covering the angle $360° - \alpha$ between the outlet opening 18 and the inlet opening 17, by using a sufficiently rigid material 19, such as a plastic or rubber-like elastomer material.

By using the above-described configuration of the intermediate plate 3, it becomes possible to easily adapt the dimensions of the canal 4 with respect to its diameter and length. Furthermore, the orifice 5 can be produced without difficulties or changes in cross section, which were encountered with the conventional intermediate plates that were divided into two parts over their entire cross section.

In order to accomplish this purpose, the ratio of the lengths of the canal 4 and the orifice 5 should be 1-20, and the ratio of the enclosed volumes should be 10-500.

Length ratio values around 6 to 10 and volume ratio vales of 50-200 have proven to be most advantageous.

Furthermore, it is advantageous to elastically support the intermediate plate 3 in its peripheral region by using integral rubber linings or flanges 20 and 21 within the holding flange 9, so that the intermediate plate can also vibrate with high frequency vibrations of small amplitude originated by the supported motor or engine, without causing a fluid exchange between the two chambers 1 and 2. This guarantees good acoustic isolation, so that the transfer of sound conducted through the body from the motor to the chassis is reduced to a great extent.

The effect of the intermediate plate constructed according to the invention will be explained with the aid of the two damping curve diagrams in FIGS. 3 and 4.

In FIG. 3 the loss angle versus the frequency is plotted for an intermediate plate with a canal 4 having only a conventional length, which holds a relatively large fluid volume. As already mentioned above in the description of the prior art, the maximum damping values are to a great extent independent of the frequency, i.e. the maximum values lie at amplitudes between 1.0 and 0.05 mm and between 10 and 15 Hz, while a rapid reduction of the damping effect occurs at higher frequencies.

Figure 4:
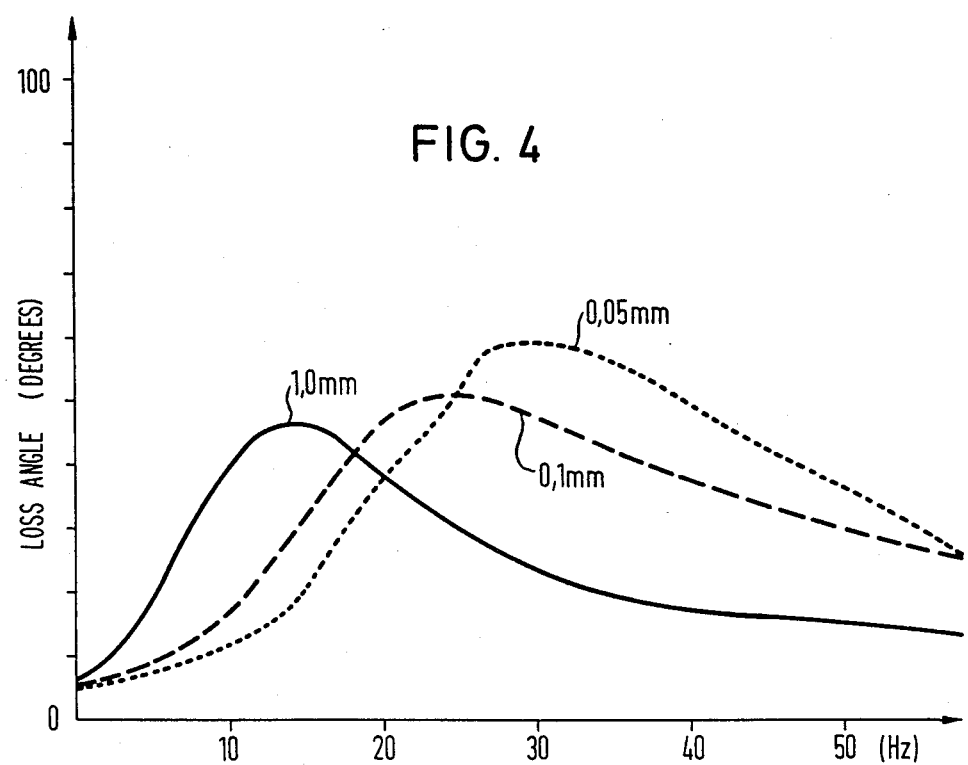
FIG. 4 is a graph of the damping curve of an engine mount provided with the spiral canal and a short-path orifice.

In contrast to FIG. 3, the parallel arrangement of the short orifice 5 with the relatively long canal 4 results in the damping shown in FIG. 4. As shown, with smaller amplitudes, the damping maxima are shifted to the right into the region of higher frequencies. Since the vibration amplitudes generally decrease with increasing frequencies in motor vehicles, the result is that the engine mount according to the invention exhibits optimal damping in the region of 12–40 Hz for amplitudes encountered in this range, for example.

Obviously, the basic principle of the invention, i.e. the parallel arrangement of a long canal and a short path orifice, is not limited to the above-described configuration of the intermediate plate, which only represents one possible construction that has proved itself very effective.

The foregoing is a description corresponding in substance to German Application P No. 34 02 715.7, filed Jan. 26, 1984, the International priority of which is being claimed for the instant application, and which is hereby made part of this application. Any material discrepancies between the foregoing specification and the aforementioned corresponding German application are to be resolved in favor of the latter.

We claim:

1. Two chamber engine mount with hydraulic damping, comprising a housing having rubber-elastic walls, an intermediate plate disposed in said housing between said walls dividing said housing into fluid-filled chambers, said intermediate plate having a relative long substantially spiral-shaped canal formed therein with two ends each communicating with a respective one of said chambers interconnecting said chambers along a substantially spiral-shaped path between said ends, said canal having a length being a multiple of the diameter thereof, and said intermediate plate having at least one relatively short orifice vertically formed therethrough being hydraulically parallel with said canal, said orifice being in said intermediate plate and having a conically-expanded outlet formed therein in communication with said circular canal.

2. Two chamber engine mount according to claim 1, wherein the ratio of the length of said spiral-shaped canal to the length of said orifice is 1-20 and the ratio of the volumes enclosed by said spiral-shaped canal and said orifice is 10-500.

3. Two chamber engine mount according to claim 1, wherein said intermediate plate is formed of first and second parts, said first part being an outer plate-shaped holding ring having an upper surface, said holding ring having a central cylindrical recess formed therein defining an inner periphery of said holding ring determining the diameter of said recess and a bottom plate determining the lower boundary of said recess, said second part being a substantially T-shaped orifice disc having an outer rim defining a larger outer periphery and an inner core defining a smaller outer periphery, said orifice disc being disposed in said recess with said outer rim of said orifice disc disposed on said upper surface of said holding ring, said inner periphery of said holding ring being spaced from said smaller outer periphery of said orifice disc defining said spiral-shaped canal therebetween, said outer rim of said orifice disc having an inlet opening of said spiral-shaped canal formed therein, and said bottom plate of said holding ring having an outlet opening of said spiral-shaped canal formed therein.

4. Two chamber engine mount according to claim 3, wherein said orifice is formed in said orifice disc.

5. Two chamber engine mount according to claim 3, wherein said spiral-shaped canal is a continuous annular space, and including rigid material filling a section of said annular space between said inlet and outlet openings.

* * * * *